(12) United States Patent
Flores et al.

(10) Patent No.: US 8,959,749 B2
(45) Date of Patent: Feb. 24, 2015

(54) TOOL AND METHOD FOR MECHANICAL ROUGHENING

(75) Inventors: Gerhard Flores, Ostfildern (DE); Erwin Baumgartner, Ostfildern (DE); Michael Rach, Ostfildern (DE)

(73) Assignee: Gehring Technologies GmbH, Ostfildern (DE)

( * ) Notice: Subject to any disclaimer, the term of this patent is extended or adjusted under 35 U.S.C. 154(b) by 194 days.

(21) Appl. No.: 13/481,971

(22) Filed: May 29, 2012

(65) Prior Publication Data

US 2012/0317790 A1 Dec. 20, 2012

(30) Foreign Application Priority Data

May 31, 2011 (DE) .......................... 10 2011 076 827
May 4, 2012 (DE) .......................... 10 2012 207 455

(51) Int. Cl.
*B23P 13/00* (2006.01)
*B23P 9/00* (2006.01)
*B23P 9/02* (2006.01)
*B23B 29/034* (2006.01)
*B23P 25/00* (2006.01)

(52) U.S. Cl.
CPC .............. *B23P 9/02* (2013.01); *B23B 29/03421* (2013.01); *B23B 29/03464* (2013.01); *B23P 25/00* (2013.01)

USPC ............................................... 29/558; 29/56.5

(58) Field of Classification Search
CPC ....... B23P 9/02; B23B 29/03464; C23C 4/02; C23C 18/22
USPC .............. 29/558, 557, 460, 56.5, 90.01, 90.2; 123/193.2; 118/72; 427/444, 289
See application file for complete search history.

(56) References Cited

U.S. PATENT DOCUMENTS

| 4,574,422 A | 3/1986 | Dickinson et al. |
| 2010/0101526 A1 | 4/2010 | Schaefer et al. |
| 2012/0311935 A1* | 12/2012 | Kujat et al. ..................... 51/298 |

FOREIGN PATENT DOCUMENTS

| DE | 197 13 519 | 11/1997 |
| DE | 10 2004 008 116 | 9/2005 |
| DE | 601 31 096 | 2/2008 |
| DE | 10 2009 028 040 | 2/2011 |

* cited by examiner

*Primary Examiner* — John C Hong
(74) *Attorney, Agent, or Firm* — Paul Vincent

(57) ABSTRACT

The invention proposes a device which prepared a cylinder bore of a combustion engine in one working stroke such that the cylinder bore can subsequently be thermally coated.

27 Claims, 6 Drawing Sheets

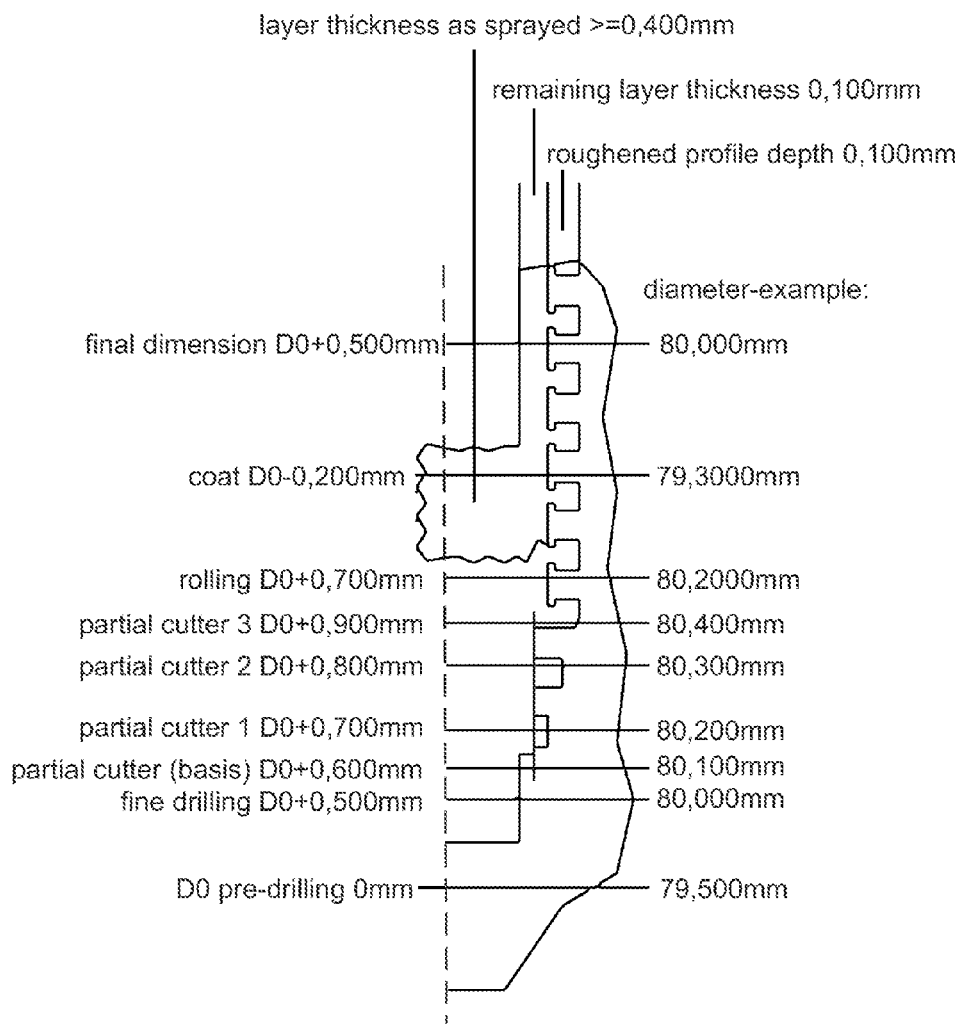
Fig. 1.1

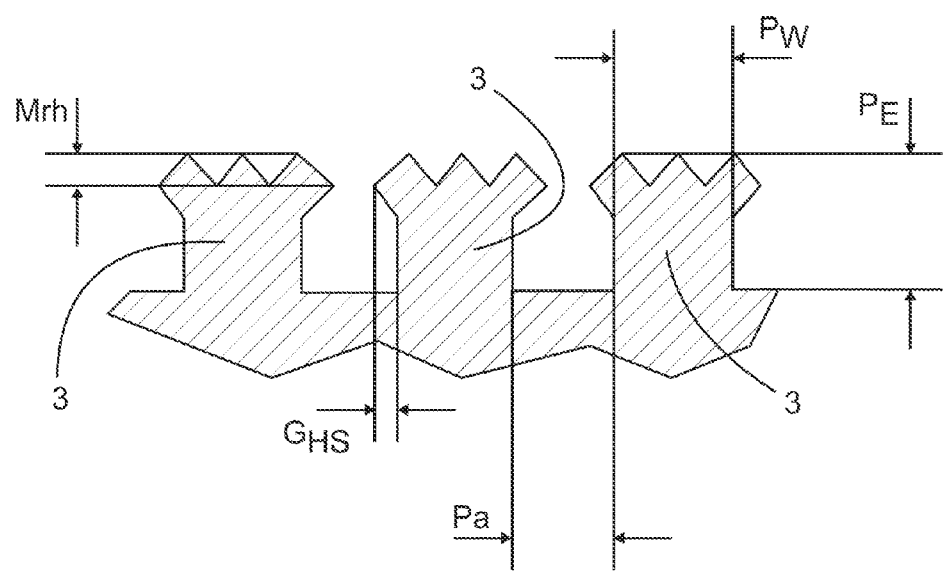
Fig. 1.2

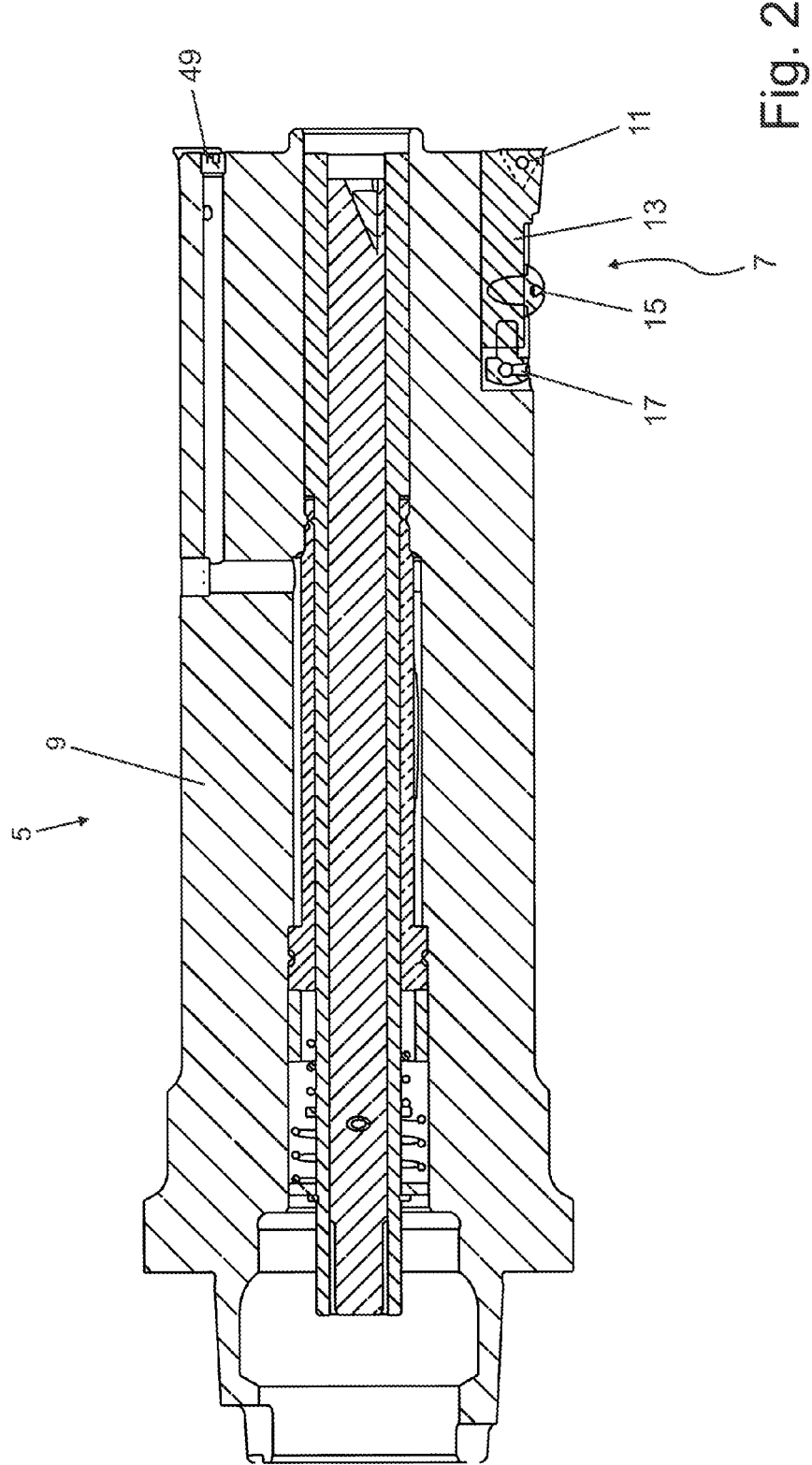

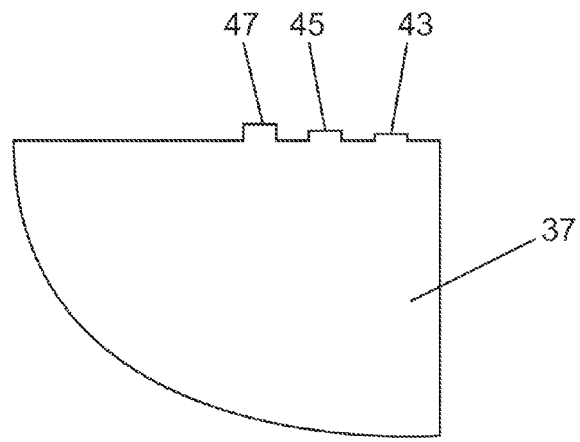
Fig. 3.1
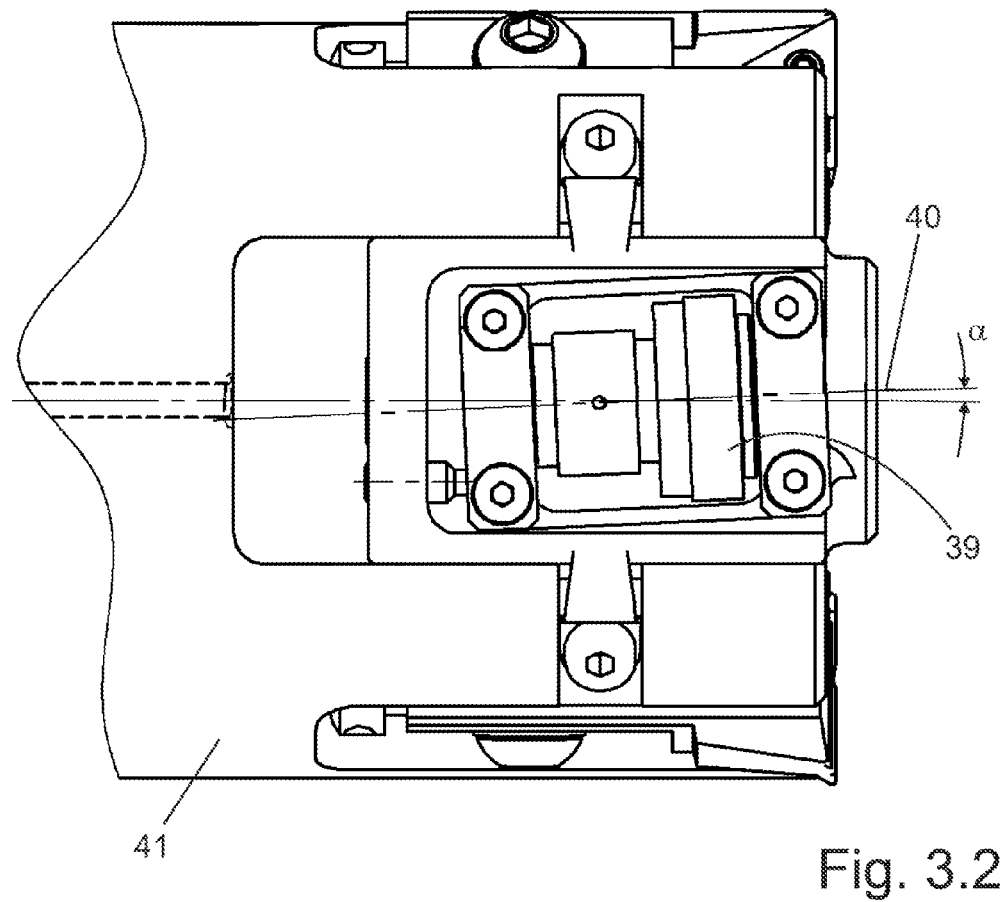
Fig. 3.2

TOOL AND METHOD FOR MECHANICAL ROUGHENING

BACKGROUND OF THE INVENTION

The processing steps of roughening, thermal coating and honing are used for manufacturing tribologically suitable surfaces in cylinder bores of combustion engines. The roughening has the purpose of creating an adequate topography on the substrate surface, which enables secure connection between the thermal sprayed coating and the substrate. The design of the profile form and the profile depth has an essential influence on the bonding tensile strength of the coating. The coating bonding per se is determined by the adhesion between the two materials, the lateral shrinkage strains resulting between the form elements of the roughening profile and the embedded coating, and the radial form fit resulting due to undercuts of the convex roughing profile elements.

The invention concerns a tool and a method for mechanically roughening a substrate surface so that a coating with very good adhesion can be applied to the substrate surface prepared according to the invention. In addition to other methods, such as sand blasting, laser blasting or high-pressure water blasting, methods of mechanical machining are known, wherein chipping and forming are combined with each other in terms of process technology. This latter group, in turn, includes processes which apply chipping and pressing involving a sliding process between the pressing tool and the material. A further combination of chipping and forming consists in chipping with subsequent rolling, wherein the surface profile that is initially generated by fine boring, rotating or milling is formed by rollers rolling over and forming the substrate surface, thereby improving the bonding characteristics.

As the invention is concerned with the last-mentioned combination of chipping and rolling (or tumbling), prior art is taken into consideration below.

EP 2 267 178 A2 describes a roughening method using a combination of chipping and rolling. The rolling operation is designed such that, with the combination tool, the distance between the roller and the form blade is dependent on the periodicity of the form profile (bridge, breadth and feed) cut in the first method step. Each roller covers one profile bridge.

The axial arrangement of the chipping tool and the roller is dependent on the form blade and its kinematic conditions, such as feed, bridge breadth, profile depth. This requires exact adjustment of the working surfaces of the blade and the roller with respect to each other. As the roller always machines only one bridge breadth, a short tool life of the roller must be expected. Furthermore, the roller is not readjustable relative to the blade in a radial direction so that, with varying wear rates, readjustment is no longer possible and the degree of forming is thereby reduced, with smaller undercuts being produced.

DE 10 2006 004 769 A1 is based on a roughening method, in which the substrate surface is chipped in a first method step and the previously chipped profile tips are "bent" in a subsequent step. This can be performed by means of rolling, pressing or blasting. For this reason, the substrate surface, i.e. the subsequent contact surface for the coating, is a profile form with undercuts. The roller is not slanted orthogonally with respect to the chipped profile, so that slippage occurs between the roller and the chipped profile.

DE 10 2008 024 313 A1 also discloses roller machining after cutting. However, the roller is designed with numerous knife discs, the cutting edges of which are arranged at a distance of the profile bars. This design has the substantial disadvantage that the tool must initially be exactly aligned to the profile tip position of the pre-machined profile form in the axial position, in order to then split the profile at these convex profile bridges by means of radial feed. Furthermore, it is necessary to exactly adjust the distance of the knife discs to the feed and the distance of the raised bridges. Also in this case, the rolling tool is profile-oriented with respect to the axial position and design, which results in complex handling for the process and also complex production as far as the distancing of the knife discs is concerned.

DE 20 2009 014 180 U1 also combines a chipping process with a rolling process for forming the profile bridges. In this method, the roller must be provided with a profiling based on the feed and the distance of the profile bridges. These tools are subject to high wear on the roller side, so that economical operation is not possible. The axial distancing of the contours of the roller from the form blade also requires substantial effort during installation of the tool.

All above-mentioned methods require tools that are difficult to manufacture and to adjust and are subject to relatively great wear, and some of which cannot be readjusted and therefore complicate or obstruct economical and reliable large-scale production.

It is the underlying purpose of the invention to provide a device and a method for mechanical roughening, which can be used independently of the subsequent coating method. The inventive device can thereby be used on a honing machine as well as on a machining center. In dependence on the material and the profile geometries, minimum quantity lubrication or heavy lubrication should both be possible.

SUMMARY OF THE INVENTION

In accordance with the object, the invention provides a combination tool performing the processing steps of
    fine boring (first tool)
    form cutting (second tool), i.e. generating a profiled surface, and
    rolling (third tool)
in one setting of the workpiece either simultaneously in one working stroke or subsequently in several working strokes in the same (set) position of the workpiece.

This design ensures that all processes have the same kinematics and axial position, and therefore a constant profile depth is obtained along the circumference during profile cutting, since fine bore blades and profile blades are arranged on the same axis of rotation in the same tool. The tool can be used on a honing machine with a double-feed device or on a machining center with comparable feed possibilities.

The inventive combination tool is rigidly connected to the machine spindle and starts machining of the upper bore edge with the leading fine bore blades of the first tool.

The at least one fine bore blade attributes the position accuracy, concerning rectangularity and position, to the bore. The fine bore blades are tightly installed in the tool, soldered or bonded in and ground to the machining diameter, or they are screwed on or clamped in on a bending support or on a tight mounting fitting and can be adjusted by means of adjusting screws into the required axial position and to the desired working diameter.

The cutting plate (form blade) disposed, in the feed direction, downstream of the second tool enlarges the diameter of the bore by a minimal addition of approximately 50 μm so that the surface created by the first tool is completely removed in a coaxial manner.

The cutting plate of the second tool preferably consists of several partial blades which successively increase with respect to the cross-sectional surface and thus the effective chipping cross-section. For this reason, the chipping volume of the second tool is divided onto several partial blades resulting in an increased tool life.

The chipping cross-section of the partial blades can be changed with increasing depth (i.e. in a radial direction) as well as with increasing breadth (i.e. in an axial direction or feed direction).

By means of the form blade of the second tool, rectangular grooves/profiles can advantageously be manufactured, however V-point-, round-, rhombic- or trapezoidal profiles can also be made with the form blade. The form blade is a one-part cutting plate which, according to the respective profile form, is sintered and/or ground or eroded.

The profile contains form-cut micro structures such as rectangular, trapezoidal or triangular profiles, on the flanks of which, due to forming of the profile bridges, sub-microprofiles such as lateral undercut-like material overhangs with smallest cracks and shinglings additionally contribute to an increased bonding. The forming process should be designed without slippage so that no chipping, but only an imprint of the roller profile causes the material flow in the forming step. In order to achieve an economical tool life, the method shall be employable in serial production for the manufacture of thermally coated cylinder bores.

The form blade of the second tool is supported on a bending support and is e.g. electro-mechanically adjusted to size via a first feed system 1 of the device according to the invention. Thus, readjustment before, during or after machining is possible in order to compensate for the wear of the cutting blade, to work true to size and to increase the tool life.

The third tool is arranged opposite to the feed direction at a minimum axial separation and comprises a rotatably supported (forming) roller. The roller is axially and radially supported so that the roller is loaded exclusively by means of rolling friction. The axial support is designed for the stroke direction according to the machining function.

The roller (third tool) can preferably be fed in a radial direction. This feed may be position-controlled and/or force-controlled. With force-controlled feed, the roller rests against the form profile previously cut by the first tool and preferably forms it such that undercuts result. Due to the defined feed force, the required forming can be achieved in a reliable and process-secure manner.

In addition to an actively controlled feed force, which is generated by a feed device of the machine, a passive feed force in the form of a centrifugal force could also be used.

This feed is realized by a second feed rod of the device according to the invention, which is again actuated by a second feed system of the honing machine or the machining center.

In order to guarantee a mere rolling function of the roller without slippage or sliding between the workpiece and the roller, the roller is slanted according to the slope resulting from the feed of the device when machining a bore. Thus, the tool life of the roller is significantly increased and the process reliability of the surface structure is improved.

The lateral area of the roller is equipped with a bonded hard solid grit, such as e.g. a diamond grit, which is designed with respect to grit structure such that the grit tips are pressed into the raised profile bridges generated by the first tool, which cause lateral displacement of the material and thus form undercut-like profiles due to the material-overhang.

The grit is to be designed in dependence on the bridge breadth. It should e.g. amount to one third (⅓) of the breadth of the convex profile bridges.

The roller is sufficiently long as to always cover several profile bridges of defined bridge breadths, which are thus simultaneously formed.

An exact positioning of the roller in an axial direction relative to the second tool is therefore not necessary.

The diamonded length of the forming roller is to be designed as large as possible in order to locally achieve as long a contact time as possible during the axial overrun.

As the device according to the invention comprises three tools (fine bore blade, form blade and roller), these tools operate with the same feed.

For this reason, and since the axis of rotation of the roller is preferably slanted in accordance with the feed of the device, the axis of rotation of the roller is orthogonal to the longitudinal direction of the profile bridge generated by the first tool.

For this reason, a sliding motion overlaying the rolling movement of the roller on the profile bridge is avoided and only imprints of the diamond grit tips, but no grooves, are generated in the convex profile bridges. If, in addition to the imprints of the diamond crystals (forming) a chipping action is desired, this can be realized through a specified non-orthogonal axial position of the roller with respect to the longitudinal axis of the bridges to be formed.

Due to these grit imprints, a material flow takes place so that the convex profile bridges are formed and lateral burrs and material overhangs are produced. The feed system can feed the roller against the bore wall in a radial direction and with a predefined contact force for forming the profile bridges.

Another variant consists in the conical design of rollers, which build up an increasing pressure with progressing axial overrun of the machined location and thus cause increased forming of the bridges.

Both alternatives enable reduction of the height of the previously cut profile bridge by 10% to 50%. The profile depth that remains after forming is approximately 100 μm.

It must be mentioned that the diamond crystals are held in a galvanically applied nickel matrix or in a sintered bonding chamfer. The individual diamond crystals are mono-crystalline crystals in a defined variable arrangement density, which are arranged in a defined concentration on the surface of the roller. The crystals should preferably not be splintered, but solid and blocky, however with small wedge angles.

It remains to be mentioned that the fine bore blades, form blade and roller completely move past the lower bore edge after crossing the complete bore length in a downstroke. As interfering edges of the bearing seats for the crankshaft support are arranged there at small distances, the fine bore blades, form blade and roller are constructively arranged in the longitudinal direction at a geometrically minimum distance.

During movement from the lower reverse point to the upper end position of the tool above the bore, the form blade and the roller are radially reset, so that collision-free crossing of the finished roughened bore surface takes place.

As the second tool slightly enlarges the diameter of the machined bore in relation to the bore diameter achieved by the first tool, the first tool need not be radially reset during withdrawal of the device from the bore.

With fine boring, form cutting and rolling, the discharge openings for coolant are respectively directed at the location of machining, i.e. toward the blade tips. The device according to the invention can also be operated with dry-machining, if applicable, with cold-air rinsing or dry-ice rinsing or other cryogenic media, as machining with minimum quantity lubrication or with heavy lubrication. The crankcase of a combustion engine shall thereby be subjected to thermal coating substantially without washing and drying.

In a further variant of an inventive device, a handling blade is additionally attached in the direction of the upper clamping end of the tool, which, when reaching the lower reversal point, carries out only one rotation for machining the upper bore edge for processing a defined piston joining chamfer.

With the device according to the invention, it is possible to generate efficient roughening profiles for high bonding tensile strengths, independently of the subsequent coating-method. As boring up, form cutting and also rolling are carried out in spatial sequence in a downstroke of the tool, minimum machining times for bores of passenger car crankcases of below 30 s can be achieved. The axial arrangement of fine bore blade, form blade and roller is realized with minimum distances, so that cylinder bores in crankcases can also be machined with small overflows.

Due to the diamonding of the roller, exact adjustment in the axial direction of the forming tool depending on the previously cut form profile is dispensed with. Thus the process becomes robust and easy to handle.

Further advantages and advantageous embodiments of the invention can be extracted from the following drawing and the description thereof.

BRIEF DESCRIPTION OF THE DRAWING

FIG. 1.1 shows a sized exemplary cross-section of a surface roughened with the device according to the invention;

FIG. 1.2 shows a further sized exemplary cross-section of a surface roughened with the device according to the invention;

FIG. 2 shows a longitudinal cut through a tool with fine bore blade according to the invention;

FIG. 3.1 shows a form blade;

FIG. 3.2 shows the arrangement of the roller.

DESCRIPTION OF THE PREFERRED EMBODIMENT

Figure 1:
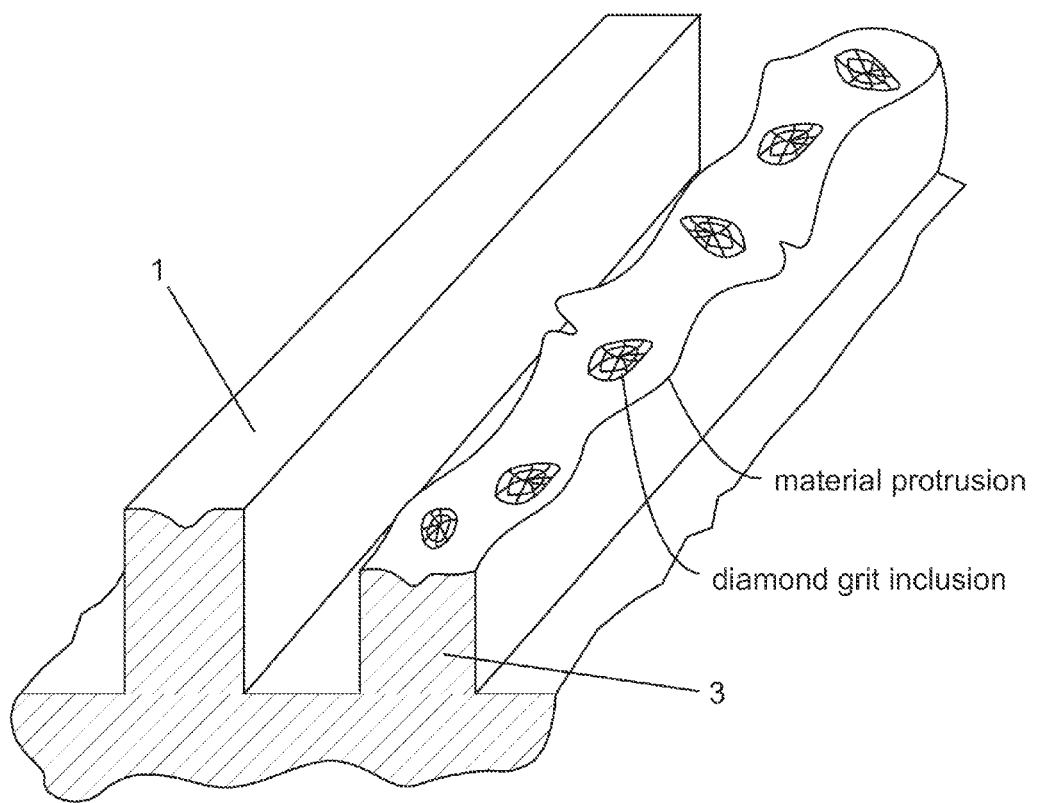
FIG. 1 shows a profile bridge before and after forming with a roller.

FIG. 1 initially exemplarily shows a profile bridge 1 before forming and a profile bridge 3 after forming with the roller according to the invention (not shown). The profile bridge 1 is manufactured by a correspondingly profiled cutting plate of the first tool.

In this example, the profile bridges have a rectangular or a square cross-section.

The profile bridge 3 is generated from the profile bridge 1 by rolling with the second tool. The convex surface of the profile bridge 3 is clearly recessed by the forming process relative to the original profile depth. In practice, a recess of up to 50% of the height of the profile bridge 1 has turned out to be advantageous.

As the roller of the second tool is preferably provided with diamond grits, the raised surface of the profile bridge 3 comprises crater-shaped indentations/imprints, which were formed by the diamond grit tips during rolling of the roller.

Due to the mentioned recess of the profile bridge and the diamond grit tips, the edges of profile bridge 3 are highly deformed, so that material overhang and micro-cracks and thus undercut-like positive-locking contours are generated.

FIG. 1.1 shows the diameter relations based on pre-boring for all process steps. An embodiment is also included.

FIG. 1 clearly shows that the stationary blade of the first tool, which is adjusted to a diameter D0 for pre-boring, is not damaged upon withdrawal from the bore, since, in the illustrated example, the bore diameter is 0.2 mm larger than the diameter D0 after rolling.

The division of the chipping volume required for generating the profile bridges 1 into three overall partial blades of the cutting plate of the first tool is clearly illustrated.

FIG. 1.2 shows a cross-section through a roughness profile produced by means of the inventive tool.

The geometry of the roughness profile is characterized by the following variables:

Profile depth $P_E$: 50-200 μm

Profile width Pw: 50-400 μm

Size of undercuts GHs: ≤0.5×Pw (25-200 μm)

0Micro roughness Mrh: ≤0.5×Pt (25-100 μm)

Profile distance Pa: ≥2×GHs

The interaction between the above-mentioned parameters produces a high bonding tensile strength and a high shear strength between the substrate and the coating in the axial and tangential directions.

In particular, the undercuts produced by forming (rolling) using the inventive tool in connection with a large microroughness on the convex surfaces of the bridges produce the desired properties.

The above-mentioned process parameters can be adjusted by the inventive tool.

The micro roughening depth is substantially influenced by the size and the shape of the diamond grits on the roller of the tool.

The size of the undercuts GHs depends to a large extent on the feed force with which the diamond grits located on the roller are pressed into the substrate, thereby forming the bridges.

The roughening result also depends on the feed speed, the type of lubricant, the volume flow and the lubricant pressure.

FIG. 2 shows a longitudinal cut through an embodiment of the device 5 according to the invention, wherein the cutting plane is arranged such that the third tool, which serves for fine boring, is visible.

The first tool 7 is screwed to a base body 9. The first tool 7 comprises a fine bore plate 11 being attached to a carrier 13. The carrier 13 is jointedly or elastically connected to one base body 9.

The fine bore plate 11 can be radially adjusted by a first adjusting screw 15 in order to exactly adjust the diameter D0.

The fine bore plate 11 can be adjusted in the axial direction by a second adjusting screw 17.

FIG. 2 shows a channel 49 through which coolant can be fed.

Several fine bore cutting plates 11 are preferably distributed over the circumference in the base body 9. The plates can be adjusted to the desired machining diameter before using the tool 5. The tool life is considerably increased by using several fine bore cutting plates 11.

All fine bore cutting plates 11 are arranged in carriers 13, which are adjustable both in the radial and the axial direction.

Figure 3:
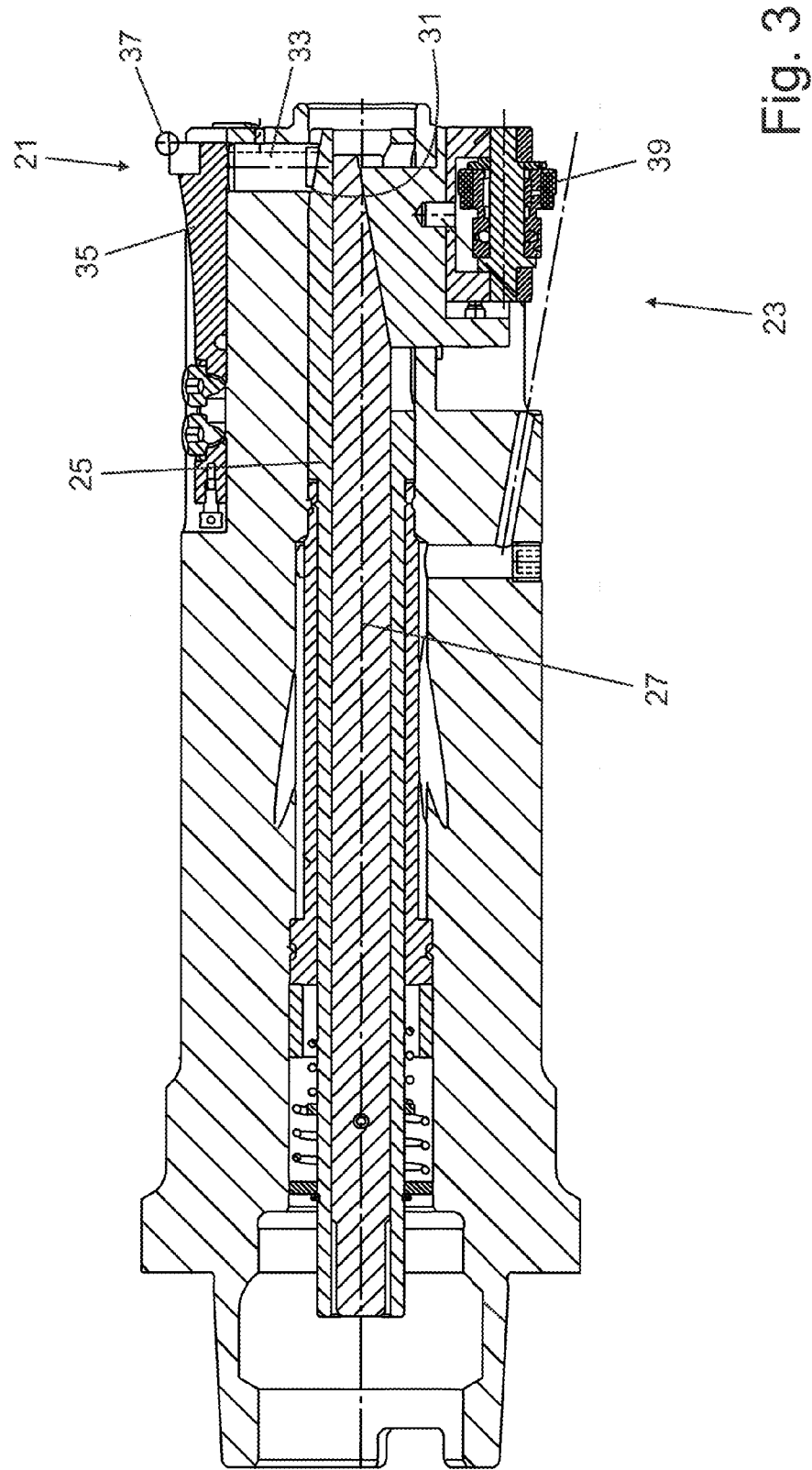
FIG. 3 shows a tool with form blade and roller.

FIG. 3 shows the device 5 according to the invention in a longitudinal cut, displaced through 90° relative to FIG. 2.

In this representation, the second tool 21 for manufacturing the profile bridge 1 (cf. FIG. 1) and the third tool 23 for forming the profile bridge 1 are clearly illustrated.

A first feed rod 25 and a second feed rod 27 are guided in the base body 9 such that they can be axially displaced.

The feed rods 25, 27 enable an independent radial feed movement of the second tool 21 and of the third tool 23.

When the feed rod 25 is moved in the axial direction of the base body 9 in the direction of the second tool 21, a tubular cone 31 displaces a radially arranged feed pin 33 in a radial direction. The feed pin 33, in turn, presses a bending support 35 with the form blade plate 37 in a radial outward direction, thereby performing a feed motion of the second tool 21.

The position of the bending support 35, in turn, is adjustable through axial adjustment.

The second feed rod 27 effects the feed of the third tool 23, which forms, with a roller 39, the profile bridge 1 previously generated by the second tool 21.

For this purpose, the second feed rod 27 is also moved towards the third tool 23, thereby actuating a radial feed of the roller 39 towards the bore wall to be machined. It is particularly advantageous for the roller 39 to be radially fed in a positive fashion such that the feed force can be controlled irrespectively of the centrifugal force that acts on the roller 39.

It has turned out to be advantageous to mount, preferably to the base body 9, a chip deflector (not shown in FIG. 3) with its diamond-equipped roller 39 between the second tool 21 and the third tool 23. This prevents the chips produced by the second tool 21 from moving between the roller 39 and the bridges 1, 3 of the substrate. The roller 39 could thereby be damaged and/or the bridge 1, 3 is greatly deformed in an uncontrolled and unpredictable fashion. Both cases are not desirable.

The roller 39 is axially and radially supported in a feed frame 41. The slant of the roller 39 is thereby adjusted such that it is preferably orthogonal to the longitudinal direction of the profile bridge 1. For this reason, the roller 39 rolls over the profile bridge 1 without sliding movement and effects the requested forming, thereby considerably increasing the tool life of the roller 39.

FIG. 3.1 shows the form blade plate 37 with the stepped partial blades 43, 45 and 47, which successively more deeply penetrate into the material.

The axial distance of the partial blades 41, 43 and 45 corresponds to the feed during machining of the bore. The partial blades 41, 43 and 45 can respectively ablate approximately 0.1 mm of material.

FIG. 3.2 shows the support of the roller 39 in the feed frame 41. The axis of rotation 40 of the roller 39 can be adjusted by adjusting screws relative to the longitudinal axis of the bore or of the profile bridge 1 generated by the first tool 21.

The feed frame 41 is secured against radial unhinging through centrifugal force by means of a leaf spring.

We claim:

1. A device for generating a roughening profile on an inner surface of a bore in a work piece, the device being designed as a combined chipping and forming tool, with a cutting tool, which is used for chipping with a geometrically defined blade for generating a pre-form of a roughening profile and with a tool, which is used for forming the pre-form of the roughening profile, wherein these tools can be fed in a radial direction, the device comprising:
   a first tool having at least one geometrically defined blade;
   a second tool disposed, in a feed direction, downstream of the first tool, wherein said second tool is a cutting tool; and
   a third tool disposed downstream of said second tool, said third tool structured for forming the pre-form of the roughening profile generated by said first and said second tools, wherein said third tool comprises a rotationally mounted roller having an axis of rotation that encloses an angle alpha with respect to a feed direction of the device, said angle alpha being selected to match a slope resulting from a feed of the device when machining the bore, thereby guaranteeing a mere rolling function of said roller without slippage or sliding between the work piece and the roller.

2. The device of claim 1, wherein said first tool comprises at least one blade, said at least one blade being arranged directly or indirectly on a base body of the device.

3. The device of claim 2, wherein said at least one blade of said first tool is mounted to a carrier and said carrier and said base body are screwed together.

4. The device of claim 2, wherein said at least one blade of said first tool is adjustable prior to machining.

5. The device of claim 2, wherein a form blade of said second tool comprises several or at least three partial blades.

6. The device of claim 5, wherein said form blade of said second tool is attached to a bending support and said bending support is screwed together with said base body at a location spaced apart from said form blade.

7. The device of claim 6, wherein a radially displaceable feed pin is guided in said base body, a first end of said feed pin supporting said bending support and a second end of said feed pin resting on a feed cone of a first feed rod or of a first feed tube.

8. The device of claim 2, wherein discharge openings for coolant and/or cryogenic media are provided in said base body.

9. The device of claim 1, wherein said angle alpha is larger than 0° and smaller than 15°.

10. The device of claim 1, wherein a lateral area of said roller is at least partially provided with hard solids, with mono-crystalline hard solids or with diamonds.

11. The device of claim 1, wherein said roller is mounted radially and axially on a radially displaceable feed frame.

12. The device of claim 11, wherein said feed frame comprises a sloped surface, which cooperates with a feed cone of a second feed rod or of a second feed tube.

13. The device of claim 12, wherein said feed frame is positively coupled to said second feed rod or said second feed tube.

14. The device of claim 1, wherein said roller is designed as a cylinder, a sphere or as a truncated cone.

15. The device of claim 1, wherein a length of a surface of said roller, which is equipped with diamonds, is at least 10-times a distance between two partial blades of said second tool or at least 10-times a feed length.

16. The device of claim 1, wherein said roller comprises diamonds having a grit size larger than 1/3 of a breadth of bridges created by said second tool.

17. The device of claim 1, wherein said second tool and/or said third tool can be fed before, during and/or after processing of a bore.

18. The device of claim 1, wherein a height of a profile bridge generated by said second tool is reduced by subsequent rolling with said third tool by up to 50% or to a profile height of approximately 100 μm.

19. The device of claim 1, wherein said first tool, said second tool and said third tool are arranged in the feed direction with minimum separation.

20. The device of claim 1, wherein said the first tool, said second tool and said third tool are arranged in the feed direction coaxially to an axis of rotation of the device.

21. The device of claim 1, wherein a deflecting contour for discharging chips is provided on said base body, on said second tool and/or on said third tool.

22. A method for roughening a cylindrical surface of a tool in a setting using a combination tool, the method comprising the steps of:
   a) fine boring with a first tool;

b) form cutting at least one profile bridge using a second tool; and c) forming the at least one profile bridge using a third tool, the third tool comprising a rotationally mounted roller having an axis of rotation that encloses an angle alpha with respect to a feed direction of the combination tool, the angle alpha being selected to match a slope resulting from a feed of the combination tool when machining the cylindrical surface of the tool, thereby guaranteeing a mere rolling function of the roller without slippage or sliding between the roller and the surface of the tool.

23. The method of claim 22, wherein the surface is roughened in one working stroke of the combination tool.

24. The method of claim 23, wherein the surface is roughened in several working strokes of the combination tool.

25. The method of claim 24, wherein the second tool and/or the third tool is fed in a radial direction between the working strokes.

26. The method of claim 24, wherein an axial position of the combination tool relative to a processed surface remains unchanged.

27. The method of claim 24, wherein a feed of the combination tool is the same in all working strokes.

* * * * *